J. G. KJELLGREN.
TRACTION METER.
APPLICATION FILED MAR. 4, 1912.

1,148,325.

Patented July 27, 1915.

Witnesses:
C. H. Boell
Walter Abb

Inventor
John G. Kjellgren
By his Attorney
Hmromann Howson

UNITED STATES PATENT OFFICE.

JOHN G. KJELLGREN, OF BROOKLYN, NEW YORK.

TRACTION-METER.

1,148,325.  Specification of Letters Patent.  Patented July 27, 1915.

Application filed March 4, 1912. Serial No. 681,595.

*To all whom it may concern:*

Be it known that I, JOHN G. KJELLGREN, a subject of the King of Sweden, and residing in the borough of Brooklyn, in the county of Kings and State of New York, have invented a certain new and Improved Traction-Meter, of which the following is a specification.

The present invention relates to traction meters, particularly for electric vehicles, the object of my invention being to provide a meter, preferably electrically operated, which will indicate not only the travel total (whether in distance, time or number of wheel revolutions) but also the travel under power, and the travel under excessive power, whereby the economy or lack of economy in consumption of motor current by the operator of the vehicle may be observed. I provide also a signal which may be used to warn the operator on the use of excessive current.

Figure 3:
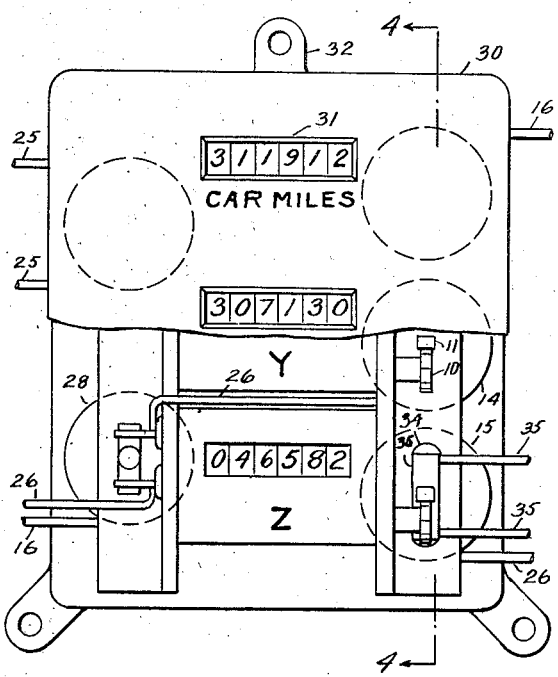
Figure 4:
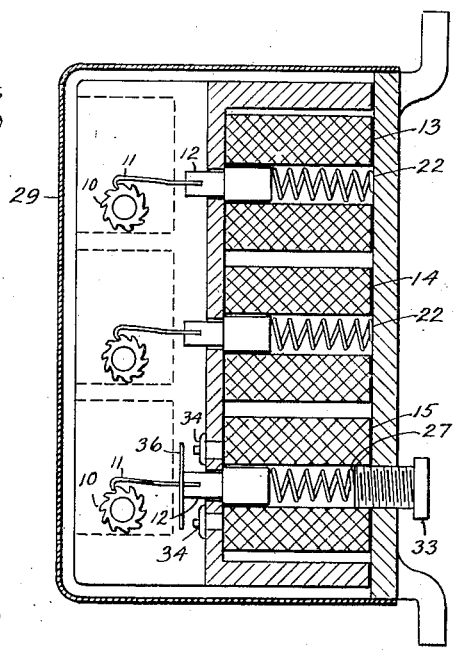
Figure 1:
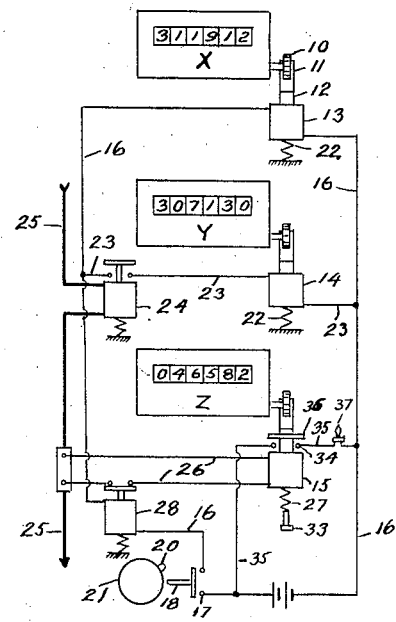
Figure 2:
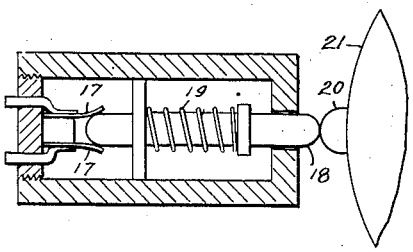

In the accompanying drawings, Figure 1 is a diagrammatic scheme of one form of my invention; Fig. 2 is a vertical section of an enlarged detail of a contact making device to operate the meter; Fig. 3 is an elevation of the meter partially broken away; and Fig. 4 is a section on the line 4—4, Fig. 3.

The operation of an electric vehicle such as an electric truck, car or train, may be conveniently divided into three periods between stop and stop, viz., (1) application of the motor power to bring and keep the car under way, (2) the shutting off of the motor power to permit the car to run under its own momentum, (3) applying brakes to bring the car to a halt. From the standpoint of economy in current consumption, it is a great advantage to have the first period as brief as possible as compared with the other two. Furthermore it is a great advantage from the standpoint of economy of operation that the current consumed in the first period shall not be excessive.

In order to indicate the travel during current consumption in proportion to the travel total, and further to indicate the use of excessive current in starting or keeping under way, I have invented the present meter by the study of the indications of which, the operation of the car under given conditions may be observed and regulated to make the current consumption substantially uniform in all cases and abuses in the control of cars corrected.

In the form shown, the present invention comprises three independent indicators X, Y, and Z each electrically operated and for the purpose of illustration, shown as counting heads of any suitable type. The indicator X is arranged to show the total travel, whether under power or not; the indicator Y to show the travel under power; and the indicator Z to show the use of excessive power. To operate each indicator, a ratchet mechanism is here shown, comprising a ratchet wheel 10 operatively connected to the unit wheel of the indicator, and a pawl 11 carried by the armature 12 of a solenoid. Three solenoid units 13, 14 and 15 are shown one for each indicator.

The unit 13 for the indicator X, is arranged in a circuit 16, independent of the motor circuit and normally open at the switch 17. A contact plunger 18 for the switch 17 is held out of engagement with the switch contacts by the spring 19, but is adapted to be pressed temporarily into circuit closing position by a cam 20 on any rotating or reciprocating part of the car when in motion, for example, the axle 21 of one of the car wheels. Obviously each rotation of the axle 21 closes the circuit 16, which energizes the solenoid unit 13, and thereby actuates the pawl 11, carried by the armature so that the unit wheel is rotated one unit for each revolution of the axle, irrespective of direction of rotation. A light return spring 22 lifts the pawl into the next tooth of the ratchet wheel 10, after each depression, so that it is in position to again rotate the ratchet one step upon the succeeding energization of the solenoid by the closing of the circuit 16.

The solenoid unit 14 for the indicator Y, is arranged in a shunt circuit 23 in parallel with the unit 13. This shunt circuit 23 however has arranged therein a relay 24, operated from the motor circuit 25 and closed only when the motor power is in use. Consequently the indicator Y, which in its method of operation is similar to that of the indicator X, is operated only when the motor power is in use. At such time the indicators X and Y are simultaneously actuated, through their armature pawls 11.

The third indicator Z has its solenoid unit 15 arranged in the shunt 26, from the motor circuit 25, which controls the relay 24. The armature of this solenoid is supported by a spring 27 sufficiently heavy to prevent the full actuating stroke of the pawl 11, except under the influence of excessive current. An adjusting screw 33 may be used to regulate the tension of this spring, in accordance with the predetermined normal use of current. Consequently even when the motor current is in use, the indicator Z is not actuated unless excessive current is employed which alone is sufficient to draw down the armature fully against the action of the spring 27. Inasmuch as excessive current is ordinarily used only during a faulty start of the car after a stop, it is sufficient for most purposes to permit the current to pass constantly through the solenoid 15 after the motor power has been applied. In this case the indicator Z will be advanced but a single unit during each application of the motor circuit, in which excess current is employed. The duration of the use of excess current may be readily indicated however, by arranging an interrupter 28 in the main shunt circuit 26. This interrupter may be operated either mechanically from the axle 21 or electrically from the circuit 16, preferably from the latter, as shown. In this case the shunt 26 is opened once on each revolution of the axle 21 and consequently the indicator Z is actuated once for each revolution of the axle so long as the excess current is employed.

When it is desirable to have all the indicators mounted in a single housing, they may be arranged as shown in Figs. 3 and 4. For convenience of inspection the indicators are arranged adjacent one face 29 of the housing 30, and sight apertures 31 are provided in the latter through which the totals on the indicators are visible. The housing may be supplied with supporting brackets 32 by which it may be mounted in view of the operator so that he may readily ascertain whether or not he is exceeding an economical current consumption during the operation of the vehicle.

In addition to the three indicators X, Y and Z, I preferably provide also a signal to warn the operator when excess current is being employed. Various ways of arranging this will readily suggest themselves. For example, a pair of contacts 34 in a signal circuit 35 may be arranged adjacent a connecting strap 36, carried by the armature of the solenoid 15 for the indicator Z. When excessive current is employed, this armature is drawn down so far that the strap 36 connects the contacts 34 thus closing the signal circuit. The particular signal arranged in this circuit may be of any preferred character. For the purpose of illustration I have shown a signal lamp 37 which may be placed at a point distant from the meter and in a conspicuous place with relation to the operator. Obviously the indicators need not be arranged in a single housing, while the particular operating mechanism and method of wiring are to be regarded as merely illustrative of the invention. Furthermore the utility of the meter is not limited to trucks, cars and trains, although particularly valuable therefor, and in the accompanying claims I use the term "traction" in a sense broad enough to cover an electrically driven machine of any character, in which economy of operation and good practice prompts the use of the motor current during only a portion of the operating period, or when there is a possibility of unnecessary or excessive current consumption in operation.

I claim as my invention:—

1. An electric traction meter device comprising an indicator, electrically actuated means for operating the same, a circuit independent of the motor circuit for energizing said actuating means, and means in connection with a moving part of the tractor for closing said circuit when the tractor is in motion, in combination with an independent indicator in parallel in said circuit and means in connection with the motor circuit for closing the circuit for said second indicator only when the motor circuit is in use, together with a third indicator in the motor circuit and means for operating the same only during the consumption of excessive current.

2. An electric traction meter device comprising an indicator, electrically actuated means for operating the same, a circuit independent of the motor circuit for energizing said actuating means, and means in connection with a moving part of the tractor for closing said circuit when the tractor is in motion, in combination with an independent indicator in parallel in said circuit and means in connection with the motor circuit for closing the circuit for said second indicator only when the motor circuit is in use, together with a third indicator in the motor circuit and means for intermittently operating the same only during the consumption of excessive current.

3. An electric traction meter device comprising an indicator, electrically actuated means for operating the same, a circuit independent of the motor circuit for energizing said actuating means, and means in connection with a moving part of the tractor for closing said circuit when the tractor is in motion, in combination with an independent indicator in parallel in said circuit and means in connection with the motor circuit for closing the circuit for said second indicator only when the motor circuit is in use, together with a third indicator in the motor circuit, a relay in the motor circuit and means in connection with the independent circuit for operating said relay to close the actuating circuit.

4. In a meter for electric tractors, a ratchet operated indicator, electro-magnetic means for actuating the ratchet, an auxiliary circuit for operating said electro-magnetic means, and intermittently-actuated means controlled by a continuously-moving element of the tractor when the latter is in motion, for rendering said auxiliary circuit operative, in combination with a second ratchet-operated indicator, and means for controlling the operation thereof from said auxiliary circuit and the tractor circuit, said means comprising an electro-magnet for actuating the ratchet and an interpreter in the electro-magnet circuit, said interrupter and electro-magnet being arranged one in the auxiliary circuit and one in the tractor circuit.

5. In a meter for electric tractors, a ratchet operated indicator, electro-magnetic means for actuating the ratchet, an auxiliary circuit for operating said electro-magnetic means, and intermittently-actuated means controlled by a continuously-moving element of the tractor when the latter is in motion, for rendering said auxiliary circuit operative, in combination with a second ratchet-operated indicator, and means for controlling the operation thereof from said auxiliary circuit and the tractor circuit, said means comprising an electro-magnet for actuating the ratchet and an interrupter in the electro-magnet circuit, said interrupter and electro-magnet being arranged one in the auxiliary circuit and one in the tractor circuit, together with a third indicator, means similar to those for operating the second indicator for operating said third indicator, and means controlling the element in the tractor circuit to insure its operation only on the use of excessive current.

6. In a meter for electric tractors, a ratchet operated indicator, electro-magnetic means for actuating the ratchet, an auxiliary circuit for operating said electro-magnetic means, and intermittently-actuated means controlled by a continuously-moving element of the tractor when the latter is in motion, for rendering said auxiliary circuit operative, in combination with a second ratchet-operated indicator, and means for controlling the operation thereof from said auxiliary circuit and the tractor circuit, said means comprising an electro-magnet for actuating the ratchet and an interrupter in the electro-magnet circuit, said interrupter and electro-magnet being arranged one in the auxiliary circuit and one in the tractor circuit, together with means for controlling the element in the tractor circuit to insure its operation only on the use of excessive current.

7. In a meter for electric tractors, a casing, a plurality of indicators arranged therein, an independent auxiliary circuit means controlled thereby for operating one of said indicators to indicate the travel total, and means controlled jointly by said auxiliary circuit and the tractor circuit for operating another of said indicators to record the total travel under power.

8. In a meter for electric tractors, a casing, a plurality of indicators arranged therein, an independent auxiliary circuit, means controlled thereby for operating one of said indicators to indicate the travel total, and means controlled jointly by said auxiliary circuit and the tractor circuit for operating another of said indicators to record the total travel under power, and a third indicator to record the total travel under excessive power.

In testimony whereof I have signed my name to this specification, in the presence of two subscribing witnesses.

JOHN G. KJELLGREN.

Witnesses:
  WALTER ABBE,
  L. H. GROTE.